(12) United States Patent
Jacobson et al.

(10) Patent No.: US 8,804,737 B2
(45) Date of Patent: Aug. 12, 2014

(54) ENCODING WATERMARKS IN A SEQUENCE OF SENT PACKETS, THE ENCODING USEFUL FOR UNIQUELY IDENTIFYING AN ENTITY IN ENCRYPTED NETWORKS

(75) Inventors: Quinn Jacobson, Sunnyvale, CA (US); Raja Bose, Mountain View, CA (US); Hawk-yin Pang, San Jose, CA (US); Vidya Raghavan Setlur, Portola Valley, CA (US); Vivek Shrivastava, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 56 days.

(21) Appl. No.: 13/336,344

(22) Filed: Dec. 23, 2011

(65) Prior Publication Data
US 2013/0163598 A1 Jun. 27, 2013

(51) Int. Cl.
*H04L 12/28* (2006.01)

(52) U.S. Cl.
USPC ........... 370/392; 370/391; 370/389; 370/394; 370/401

(58) Field of Classification Search
USPC .................. 370/252, 394, 392, 241, 389, 391
See application file for complete search history.

(56) References Cited

U.S. PATENT DOCUMENTS

| | | | |
|---|---|---|---|
| 5,907,550 A * | 5/1999 | Hontz | 370/389 |
| 6,728,232 B2 | 4/2004 | Hasty, Jr. et al. | 370/338 |
| 6,862,286 B1 | 3/2005 | Tams et al. | 370/401 |
| 7,327,676 B2 * | 2/2008 | Teruhi et al. | 370/230 |
| 7,480,246 B2 * | 1/2009 | Agarwal et al. | 370/235 |
| 7,587,587 B2 * | 9/2009 | Buer et al. | 713/153 |
| 7,623,501 B2 | 11/2009 | Rangarajan et al. | 370/338 |
| 7,724,782 B2 | 5/2010 | Wang et al. | 370/514 |
| 7,764,717 B1 * | 7/2010 | Yu et al. | 370/537 |
| 7,885,803 B2 * | 2/2011 | Nuzman et al. | 703/21 |
| 7,908,119 B2 * | 3/2011 | Bondi | 702/186 |
| 7,961,637 B2 * | 6/2011 | McBeath | 370/252 |
| 7,991,919 B2 * | 8/2011 | Satt et al. | 709/250 |
| 8,335,214 B2 * | 12/2012 | Lee et al. | 370/389 |
| 2005/0030952 A1 * | 2/2005 | Elmasry et al. | 370/395.2 |
| 2005/0183143 A1 * | 8/2005 | Anderholm et al. | 726/22 |
| 2006/0064746 A1 | 3/2006 | Aaron et al. | 726/13 |
| 2006/0161986 A1 | 7/2006 | Singh et al. | 726/24 |
| 2008/0130539 A1 | 6/2008 | Lauer et al. | 370/310 |
| 2010/0169652 A1 | 7/2010 | Butler | 713/176 |
| 2010/0195819 A1 | 8/2010 | Wang et al. | 380/1 |
| 2011/0126018 A1 | 5/2011 | Narsinh et al. | 713/176 |

* cited by examiner

*Primary Examiner* — Ricky Ngo
*Assistant Examiner* — Dewanda Samuel
(74) *Attorney, Agent, or Firm* — Harrington & Smith (57) ABSTRACT

A method includes sending over the network from a source entity to a destination entity a sequence of a plurality of packets. Each packet in the sequence includes a same identifier corresponding to a network entity on the network. Sending includes modifying a property of the sequence of packets to uniquely identify the sequence of packets. The method includes receiving information indicating the identifier corresponds to the modification of the property. Another method includes examining a sequence of packets sent over a network from a source entity to a destination entity, each packet in the sequence comprising a same identifier corresponding to a network entity on the network. The method includes determining whether a property of the sequence of packets was modified when sent to uniquely identify the sequence of packets; and responsive to the determining, associating the identifier with the network identity. Apparatus and program products are also disclosed.

18 Claims, 7 Drawing Sheets

ENCODING WATERMARKS IN A SEQUENCE OF SENT PACKETS, THE ENCODING USEFUL FOR UNIQUELY IDENTIFYING AN ENTITY IN ENCRYPTED NETWORKS

TECHNICAL FIELD

This invention relates generally to wired and/or wireless networks and, more specifically, relates to communication of packets in the networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Many network applications require unique identifiers for different network entities. One such unique identifier is the media access control (MAC) address. A MAC address uniquely identifies any network-enabled device. This is true because any network adapter, such as a network interface card, is assigned a unique MAC address. Thus, even network-enabled devices with multiple network adapters may be uniquely identified using one or more of the MAC addresses of the network adapters. However, most communication end points are identified as Internet protocol (IP) addresses by user-level applications, which typically use socket application programmer interfaces (APIs) provided by an operating system. However, IP addresses are not unique identifiers and can change with time. On the other hand, a MAC address is a unique and static identifier for a network adapter, and is assigned by the vendor of the adapter. The key problem here is to identify a network entity with its MAC address.

Inferring the MAC address of any network entity requires inspection of network packets to map the IP address known to user-level applications to the MAC address of the network entity. Apart from being very resource intensive, this solution will not work in encrypted networks, where the data payload including the IP header (containing an IP address of the network entity) is encrypted and not available for inspection. Hence, determining a unique network identifier of a network entity is difficult by just using packet inspection. Other mechanisms might involve querying the network entity for this information, which will in-turn require the application to acquire suitable permissions on the network entity. The application may not be able to acquire the permissions.

SUMMARY

In an exemplary embodiment, an apparatus includes one or more processors and one or more memories including computer program code. The one or more memories and the computer program code are configured to, with the one or more processors, cause the apparatus to perform at least the following: sending over the network from a source entity to a destination entity a sequence of a plurality of packets, each packet in the sequence comprising a same identifier corresponding to a network entity on the network, wherein sending comprises modifying a property of the sequence of packets to uniquely identify the sequence of packets; and receiving information indicating the identifier corresponds to the modification of the property.

In a further exemplary embodiment, a method is disclosed that includes: sending over the network from a source entity to a destination entity a sequence of a plurality of packets, each packet in the sequence comprising a same identifier corresponding to a network entity on the network, wherein sending comprises modifying a property of the sequence of packets to uniquely identify the sequence of packets; and receiving information indicating the identifier corresponds to the modification of the property.

In an additional exemplary embodiment, a computer program product is disclosed that includes a computer-readable medium bearing computer program code embodied therein for use with a computer. The computer program code includes: code for sending over the network from a source entity to a destination entity a sequence of a plurality of packets, each packet in the sequence comprising a same identifier corresponding to a network entity on the network, wherein sending comprises modifying a property of the sequence of packets to uniquely identify the sequence of packets; and code for receiving information indicating the identifier corresponds to the modification of the property.

Another exemplary embodiment is an apparatus including: means for sending over the network from a source entity to a destination entity a sequence of a plurality of packets, each packet in the sequence comprising a same identifier corresponding to a network entity on the network, wherein the means for sending comprises means for modifying a property of the sequence of packets to uniquely identify the sequence of packets; and means for receiving information indicating the identifier corresponds to the modification of the property.

A further exemplary embodiment includes an apparatus, which includes one or more processors and one or more memories including computer program code. The one or more memories and the computer program code are configured to, with the one or more processors, cause the apparatus to perform at least the following: examining a sequence of packets sent over a network from a source entity to a destination entity, each packet in the sequence comprising a same identifier corresponding to a network entity on the network; determining whether a property of the sequence of packets was modified when sent by the source entity to uniquely identify the sequence of packets; and responsive to a determination the property of the sequence of packets was modified when sent to uniquely identify the packets, associating the identifier with the network identity.

In a further exemplary embodiment, a method includes: examining a sequence of packets sent over a network from a source entity to a destination entity, each packet in the sequence comprising a same identifier corresponding to a network entity on the network; determining whether a property of the sequence of packets was modified when sent by the source entity to uniquely identify the sequence of packets; and responsive to a determination the property of the sequence of packets was modified when sent to uniquely identify the packets, associating the identifier with the network identity.

In an additional exemplary embodiment, a computer program product is disclosed that includes a computer-readable medium bearing computer program code embodied therein for use with a computer. The computer program code includes: code for examining a sequence of packets sent over a network from a source entity to a destination entity, each packet in the sequence comprising a same identifier corresponding to a network entity on the network; code for determining whether a property of the sequence of packets was modified when sent by the source entity to uniquely identify the sequence of packets; and code for responsive to a determination the property of the sequence of packets was modified when sent to uniquely identify the packets, associating the identifier with the network identity.

In yet another embodiment, an apparatus includes means for examining a sequence of packets sent over a network from a source entity to a destination entity, each packet in the sequence comprising a same identifier corresponding to a network entity on the network; means for determining whether a property of the sequence of packets was modified when sent by the source entity to uniquely identify the sequence of packets; and means, responsive to a determination the property of the sequence of packets was modified when sent to uniquely identify the packets, for associating the identifier with the network identity.

DETAILED DESCRIPTION OF THE DRAWINGS

The following description uses the example of MAC addresses. However, this is only exemplary and the described techniques may be used in any system that needs to identify a network entity with a unique identifier. The described techniques could be useful, for instance, in systems like ad-hoc networks, peer-to-peer networks or WiFi direct networking, where the devices need to identify each other before pairing and establishing a secure connection.

Figure 1:
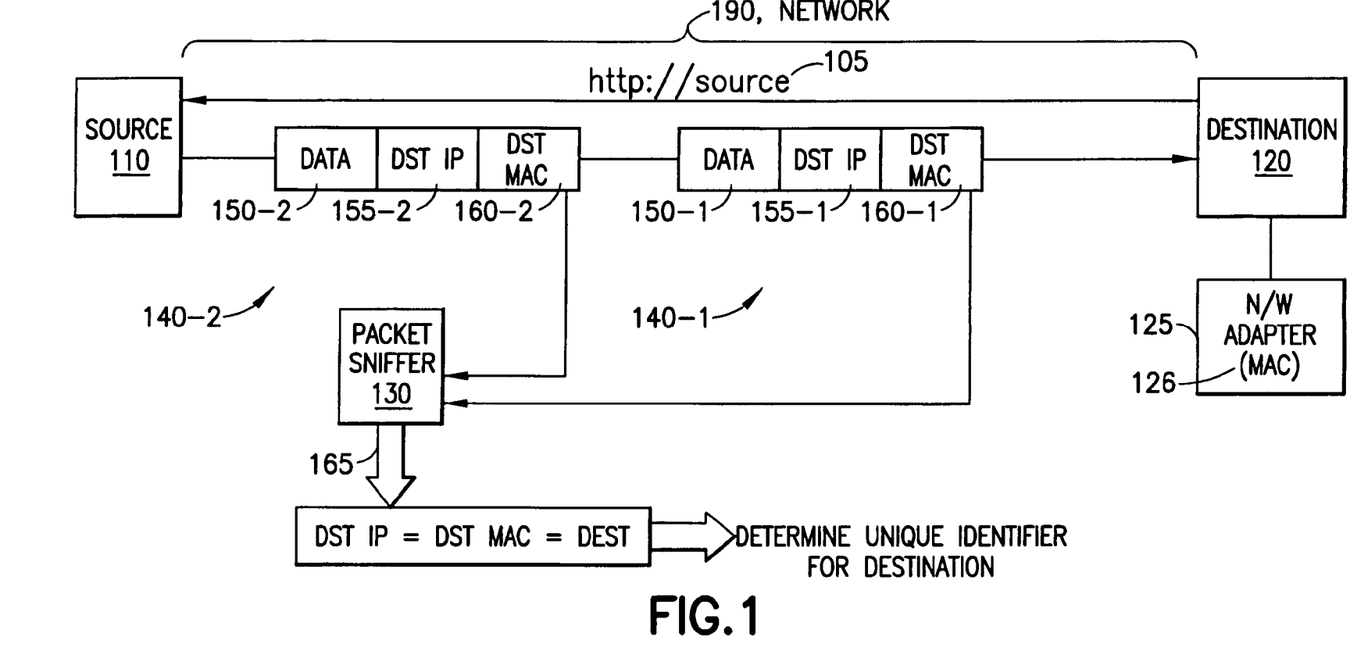
FIG. 1 illustrates how a unique identifier of a MAC address can be easily identified in unencrypted networks.

FIG. 1 shows how a unique network identifier such as a MAC address can be identified easily in unencrypted networks. The source 110 and destination 120 communicate over network 190. The destination 120 sends a message 105 to the source 110. This message 105 is part of an initial establishment of connection, and is for illustration purposes. The message 105 could be any message the sender (e.g., destination 120) wishes to communicate to the source 110. The source 110 sends two packets 140-1 and 140-2 to the destination 120. The packets 140 could be any message the sender (e.g., source 110) wishes to communicate to the destination 120 (e.g., the message could be a simple "Hello" or "HeartBeat" keep alive message). It is only required that the sender (source 110 in this example) package the information to be communicated in packets with unique signatures. Each packet includes corresponding data portions 150, IP headers 155 (including the destination IP address, DST IP, of the destination 120), and MAC headers 160 (including the destination MAC address, DST MAC, of the destination 120). Each destination MAC address (DST MAC) is the MAC address 126 of the network (N/W) adapter 125 in the destination 120. Each destination IP address corresponds to an IP address associated with the destination 120. A packet sniffer 130 examines the packets 140 in operation 165 and determines that a destination IP address (DST IP) corresponds to the destination MAC address (DST MAC) and therefore corresponds to the destination 120. Thus, the packet sniffer 130 uniquely determines an identifier (e.g., the MAC address 126) for the destination 120.

Figure 2:
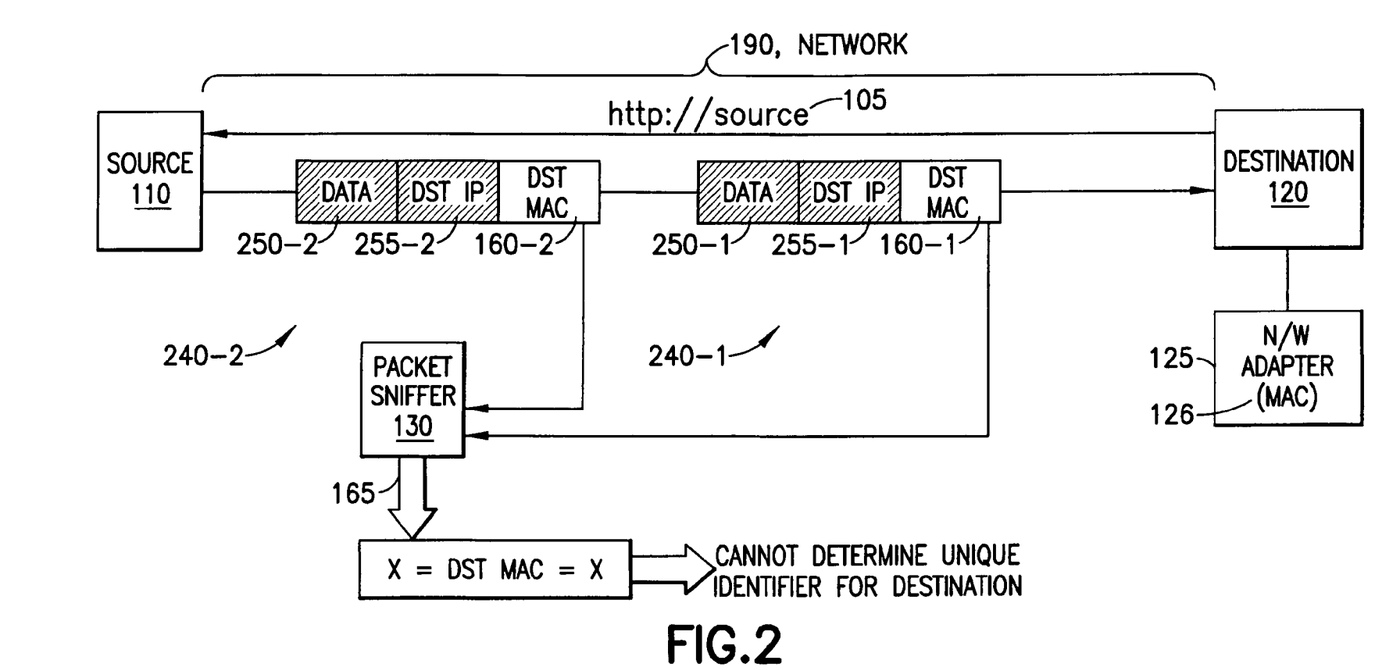
FIG. 2 illustrates how a unique identifier of a MAC address cannot be easily identified in encrypted networks.

However, as stated above, there are instances where determining a unique network identifier of a network entity is difficult by just using packet inspection. FIG. 2 shows a current problem in uniquely identifying a remote entity's MAC address in encrypted wireless networks. The remote entity is same as the destination of the communication or the entity whose MAC address is being determined. Since the data packets 240 are partially encrypted (the data portions 250 and the IP headers 255 are encrypted but the MAC headers 160 are not), it is difficult for the sniffing entity (packet sniffer 130) that may be operating, e.g., on the user level to actually identify the MAC address 126 of the remote entity (destination 120 in this example) since IP-to-MAC address mapping is not possible without decrypting the packets 240. In the operation 165, the packet sniffer cannot determine a unique identifier for the destination.

Exemplary embodiments of the instant invention propose that a sequence of the packets to a particular destination encodes watermarks so that one can accurately identify, e.g., the destination MAC address by sniffing (e.g., examining packets) on the communication medium. The IP address of the remote entity can be easily determined by a user level application (on source 110) that can get this information when the connection is established. Encoding watermarks into a sequence of packets can be achieved by customizing sequence properties that can be observed without deep packet inspection. Such properties include, as non-limiting examples, packet size, packet inter-arrival times, or packet data rates, on the basis of remote communication entities. Such encoded watermarking can then be detected by passive sniffing, which can look up the MAC address on the packets in the sequence to establish the connection between the remote entity (noted at the application layer) and its MAC address.

Figure 3:
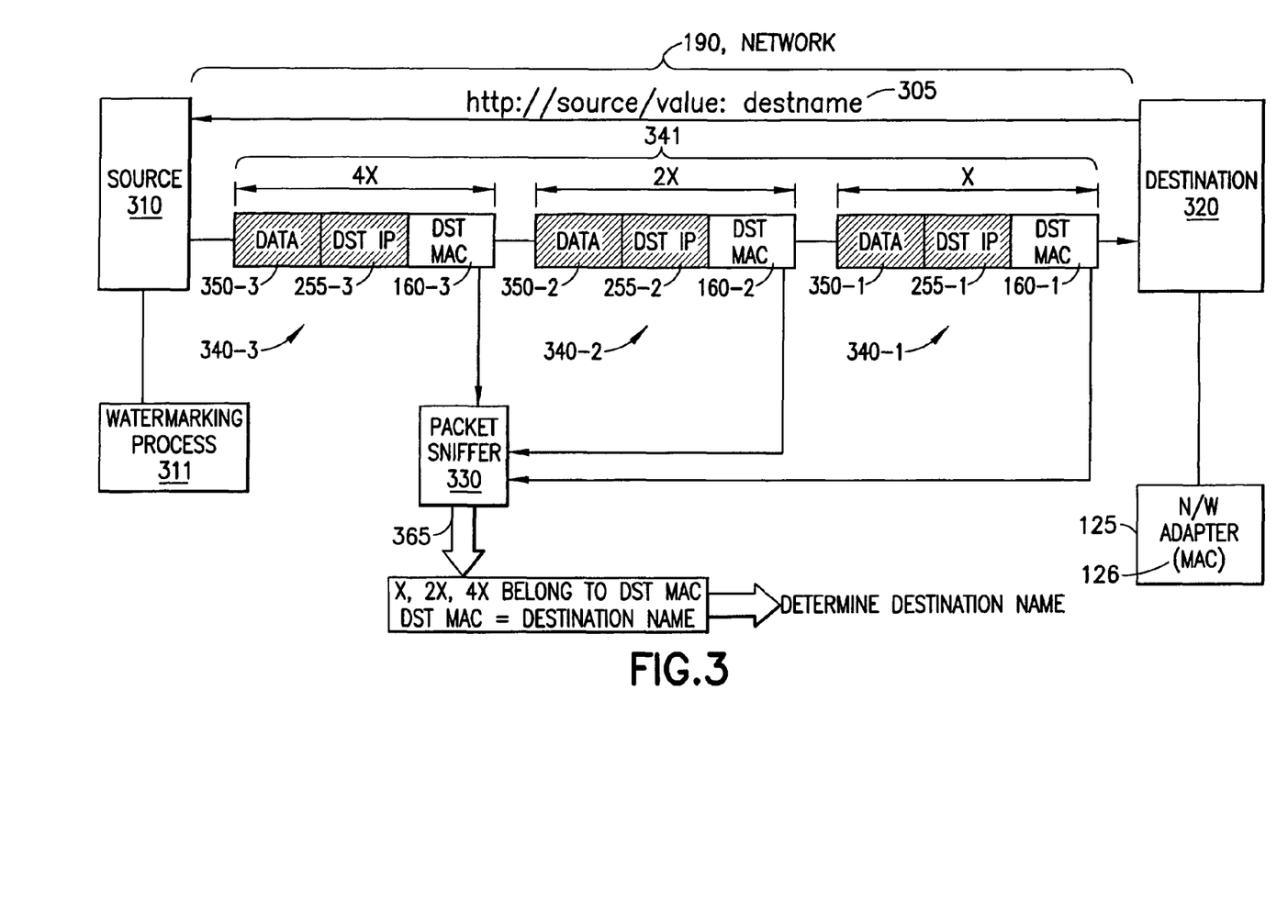
FIG. 3 is an example illustrating how an exemplary embodiment accurately identifies a unique identifier of the MAC address of a network entity, e.g., without requiring low-level access to operating system information.

FIG. 3 is one example showing how the instant invention can solve the problem. Using this exemplary solution, the packet sniffer 330 can accurately identify the MAC address 126 of the remote entity (destination 320 in this example) without requiring low level access to the operating system data. For instance, during the connection establishment process, the destination 320 communicates the message 305 to the source 310. The message 305 provides a destination name ("destname") for the source 310 to use. It is noted that the destination IP address (and the source IP address) is automatically determined when two machines connect over a network socket, so the destination IP address is known. The source 310 includes a watermarking process 311. The watermarking process 311 in this example sends three packets 340-1, 340-2, and 340-3 to the destination. The data portions 350 and the IP headers 255 are encrypted. The watermarking process 311 encodes a watermark into the sequence 341 of packets 340-1 through 340-3 (340-1 sent first; 340-2 sent second; 340-3 sent last) by modifying a property of the sequence 341. Specifically for this example, the watermarking process 311 varies the number of bytes in the packets, from X bytes in packet 340-1, to 2X bytes in packet 340-2, to 4X bytes in packet 340-3. This modification of a property of the sequence is a modification of the size of the packets. This modification therefore embeds a watermark into the sequence 341. The data portions 350 are modified in this example to modify the sizes of the packets.

The packet sniffer 330 can determine (operation 365) the modification (e.g., X, 2X, 4X) in the property (e.g., size of packets 340) of the sequence 341, and in operation 365 determine that the sequence belongs to the destination MAC address (DST MAC) in the MAC headers 160, and therefore the destination MAC address is associated with the destination name (as defined by the "destname" in message 305). It is noted that the packet sniffer 330 can sniff the message 305 to determine the "destname". Providing a destination name is optional. The destname can be a user-defined name (like MyLaptop, MyTablet, etc), which can be communicated using the communication channel (e.g., over network 190). This name just allows an entity to refer to a remote entity with an intuitive name. For example, suppose it is determined that the remote MAC address is XX:XX:XX:XX:XX:XX using the instant techniques, then a node such as the packet sniffer 330 or the source 310 can just assign the remote MAC address a more meaningful name such as MyPhone or just simply NodeX. The remote entity (destination 320 in this example) can also share its destname during the connection establishment phase (as shown in message 305), in which case that name is mapped to the MAC address determined by the instant techniques. Note also that the destname need not be unique (e.g., MAC XX might be called "phone" at one point in time, while MAC YY might be called "phone" at another point in time).

Figure 4:
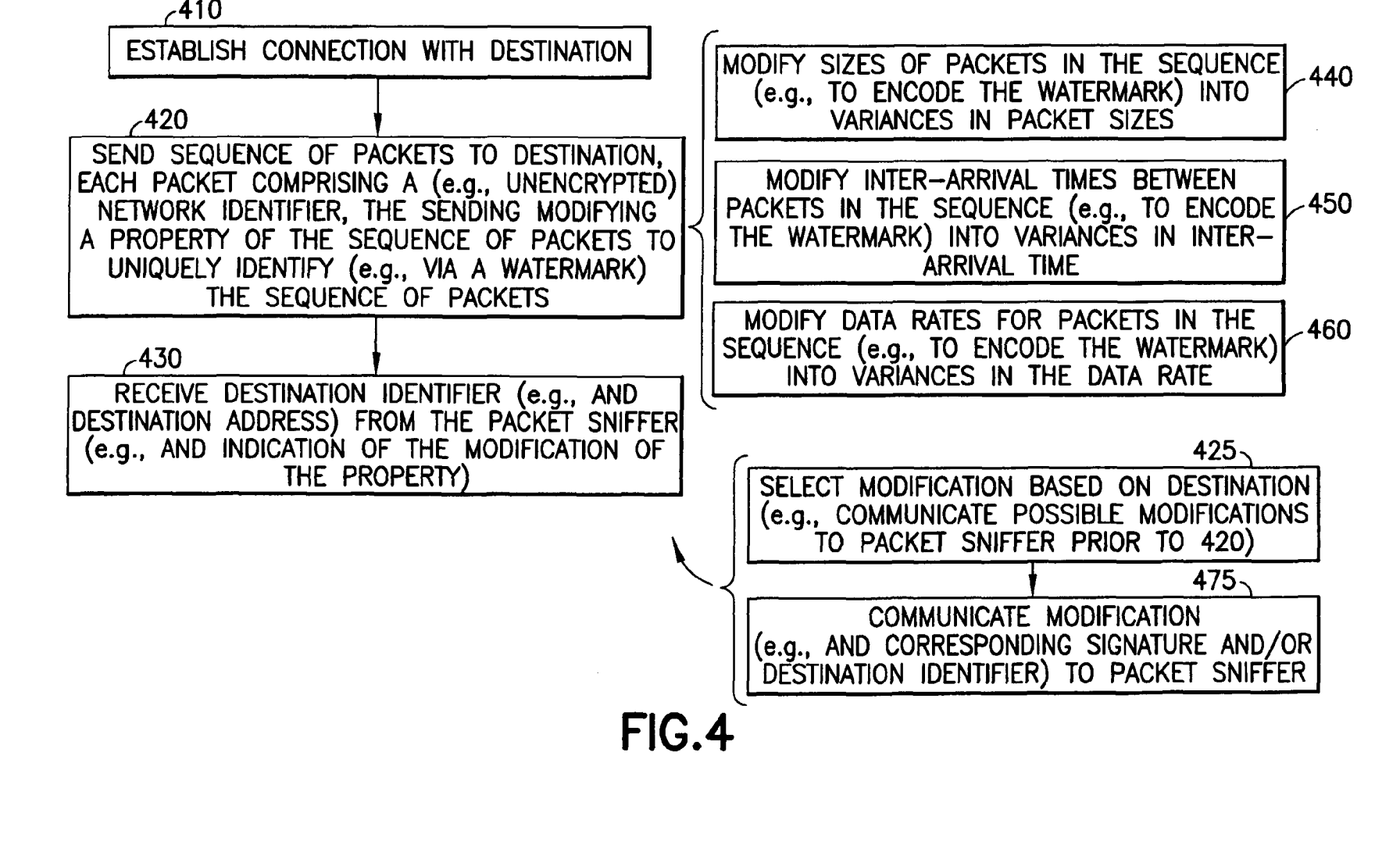
FIG. 4 is a block diagram of a flowchart for modifying a property of a sequence of sent packets to uniquely identify an entity on a network.
Figure 5:
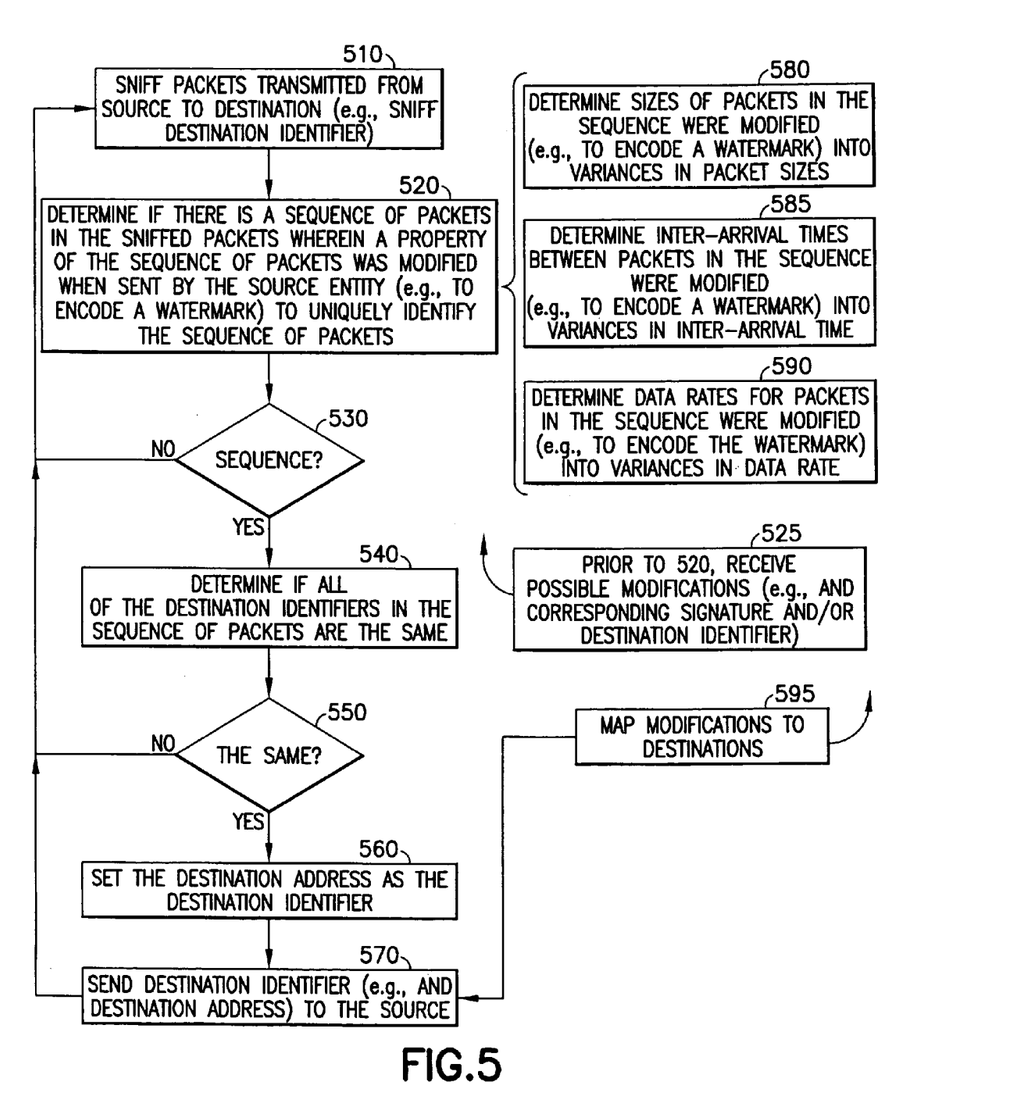
FIG. 5 is a block diagram of a flowchart for examining a property of a sequence of sent packets and uniquely identifying an entity in the network based thereon.

Reference may be made to FIG. 4, illustrating a flowchart performed by the source 310 for modifying a property of a sequence of sent packets to uniquely identify an entity on a network, and FIG. 5, illustrating a flowchart for examining (by a packet sniffer 330) a property of a sequence of sent packets and uniquely identifying an entity in the network based thereon. The operations shown in FIGS. 4 and 5 may be implemented by software (or firmware) that is executed on hardware, by hardware such as an integrated circuit having operations implemented thereon, or by some combination of these.

The following operations are used in an exemplary implementation of this invention.

1. A remote entity (e.g., destination 320) establishes a connection (block 410 of FIG. 4) with the local entity (e.g., source 310) using, e.g., state-of-the-art IP sockets or other mechanisms (like Bluetooth personal area network, PAN). This connection could have many purposes. Thus, a purpose of this connection could include the following: 1) To transfer content between the two entities, 2) To stream content between the two entities, 3) To enable any other interaction between the two devices such as playing games.

2. Once the connection is established, the local entity (e.g., source 310) sends (block 420 of FIG. 4) the remote entity (e.g., destination 320) a sequence 341 of packets 340, each of which includes the MAC address 126 (e.g., as DST MAC in MAC headers 160). The sending modifies (block 420 of FIG. 4) a property of the sequence of packets (e.g., the modification encoding a watermark into the sequence of packets). The modification uniquely identifies the sequence of packets (and therefore the destination 330) relative to other sequences of packets having a different modification or no modification. One example of this modification is described above in reference to FIG. 3, and additional description of that example is provided below. Other examples are described in more detail below. It is noted that block 420 corresponds to the watermarking process 310 described above.

3. A sniffer application (e.g., running locally or remotely) can capture (e.g., "sniff") these packets (block 510 of FIG. 5) and identify (block 520 of FIG. 5) the watermark encoded in the sequence 341 of packets 340 to the remote entity (e.g., destination 320). It is noted that during the sniffing of packets, the packet sniffer 330 can determine a destination identifier (e.g., determine "destname" from message 305). The packet sniffer 330 then notes the remote MAC address (MAC address 126) that should be present on these packets and can convey this information to the local entity (e.g., the source 310, but see the description below).

Note that it is not necessary to examine the encrypted IP headers 255 of the packets 340 to make the mapping from IP to MAC in this example, and hence this solution will work even in encrypted wired or wireless networks.

In terms of the sniffer application (shown as packet sniffer 330) running locally or remotely, this may be explained as follows. Suppose entity A (e.g., source 310) wants to ascertain the MAC address of entity B (e.g., destination 320) with which entity A is communicating. Using techniques described herein, either entity A can sniff the communication itself and determine the MAC address or a third entity (say entity C) can also sniff this communication between entities A and B, and can infer the MAC address of B, and then pass this MAC address information to entity A. In the first case when entity A itself does the sniffing, this is referred to as local sniffing and if a third party (e.g., entity C) does the sniffing, this is referred to as a remote sniffing.

The implementation of watermarking (and corresponding modification of a property of a sequence of packets) can take a number of different forms:

1) One exemplary implementation of this invention involves customizing the size of packets 340 in a sequence 341 of network packets destined for a particular remote entity. For example, a first packet is of size 100 bytes, the next packet is of size 200 bytes, the next packet is of size 400 bytes, and so on. See block 440 of FIG. 4. Also, see FIG. 3 for another description of this exemplary implementation. By observing the pattern in packet sizes (see block 580 of FIG. 5), any sniffing utility can infer that the packets belong to the target remote entity and note the MAC address 126 of the remote entity for unique identification. It is noted that the sequences 341 shown in FIG. 3 and described here are merely exemplary. For instance, the sequence 341 could be reversed (e.g., 4X then 2X then 1X instead of 1X then 2X then 4X), and there may be sequence implementations where the same sizes are used (e.g., 1X, 2X, 4X, 4X, 2X, 1X in this order).

2) Another exemplary implementation of this invention involves modifying (see block 450 of FIG. 4) the inter-arrival times of packets in a sequence 341 of network packets destined for a particular remote node. For example, a gap between sending the first and second packets is 100 ms (millisecond), a gap between sending the second and third packets is 200 ms, and the gap between sending third and fourth packets is 400 ms. It is noted that the gaps between the arrival times of packets are assumed to be similar to the gaps used between sending the packets, although network variances may change the gaps slightly. Therefore, some variance in the inter-arrival times is expected. By observing the pattern in (expected) inter-arrival times, any sniffing utility can infer (see block 585 of FIG. 5) that the packets belong to the target remote node and note its MAC address for unique identification. It is noted that the sequences 341 described here are merely exemplary. For instance, the sequence 341 could be reversed (e.g., 400 ms then 200 ms then 100 ms instead of 100 ms, 200 ms, 400 ms), and there may be sequence implementations where the same inter-arrival times are used (e.g., 400 ms, then 200 ms, then 100 ms, then 100 ms, then 200 ms, then 400 ms in this order).

3) Another exemplary implementation of this invention involves modifying the data rate (see block 460 of FIG. 4) of some sequence 341 of network packets destined for a particular remote entity (e.g., destination 320). For example, a first packet is sent at 6 Mbps (megabits per second), a next packet is sent at 12 Mbps, a next packet at 24 Mbps and so on. By observing the pattern in data rates, any sniffing utility such as a packet sniffer 330 can infer (see block 590 of FIG. 5) that the packets belong to the target remote entity (e.g., destination 320) and note the MAC address of the destination 320 for unique identification. Again, these are merely exemplary and the data rates applied to the sequence 341 may be different from these examples.

In FIG. 5 (and FIG. 4), some additional exemplary operations are described. If the packet sniffer 330 determines there is no sequence 341 of packets 340 (block 530=No), the packet sniffer 330 returns to block 510. If there is a sequence (block 530=Yes), then it is determined if all the destination identifiers (e.g., DST MAC 160) in the sequence 341 of packets 340 are the same. It is also noted that the instant techniques may be used on identities other than destination identifiers, such as identifiers for sources or other network entities. If the destination identifiers are not all the same (block 550=No), the packet sniffer 330 will transition to block 510. If the destination identifiers are all the same (block 550=Yes), the packet sniffer 330 sets (block 560) the destination address as the destination identifier (e.g., DST MAC 160).

In block 570, the packet sniffer 330 sends the destination identifier to the source 310 (which receives the destination identifier in block 430 of FIG. 4). Note that the destination identifier may be a unique identifier such as the MAC address, in which case the destination identifier may only be the unique identifier. Optionally, the destination identifier may also be an assigned destination name, such as "destname" (as described above), and therefore the destination address (e.g., MAC address) may also be sent in block 570 and received in block 430 of FIG. 4. The source 310 may also receive an indication of the modification (described below) from the packet sniffer 330. It is noted that if the packet sniffer 330 is an application running in a source node, the packet sniffer 330 may perform block 570 by "sending" the information to a source entity 310 that is a source application on the source node.

Furthermore, each destination may be assigned a different modification. For instance, block 425 of FIG. 4, the source entity 310 selects modifications based on destinations. For instance, one destination may be selected for a modification 440 while another might be selected for a modification 450; one destination may be selected for one modification 440 (e.g., X, 2X, 4X) while another might be selected for a different modification 440 (e.g., X, 3X, 9X). There may be a communication (block 475, block 525) between the source entity 310 and the packet sniffer 330 so that the packet sniffer would be informed of the types of modifications that might be used. This communication may also include a signature for the packet sniffer 330 to use in block 570, where a signature corresponds to a modification and provides an indication of that modification. The signature allows the source 310 in block 430 to equate the modification with the destination address. The communication may also include the destination identifier, which may be used additionally to the signature or in lieu of the signature. The types of modifications (and corresponding signatures) may also be preprogrammed or programmed by another entity (e.g., a server) on the network and no communication between the source entity 310 and packet sniffer 330 would be necessary. In block 595, the packet sniffer 330 can map the modifications to the destinations. This allows the packet sniffer 330 to send information about the modification in addition to the destination identifier, if the destination identifier is only a MAC address and not a destination name. For instance, if the source entity 310 is sending packets to two destination entities 320 and the source entity 310 is using modification 440 for destination A and modification 450 for destination B, but there are no destination names for destination A and destination B, the packet sniffer 330 then should distinguish between the two destinations, perhaps by sending indications as to which destination corresponds to which modification 440 or 450 (e.g., "destination A=MAC address A and modification 440").

Figure 6:
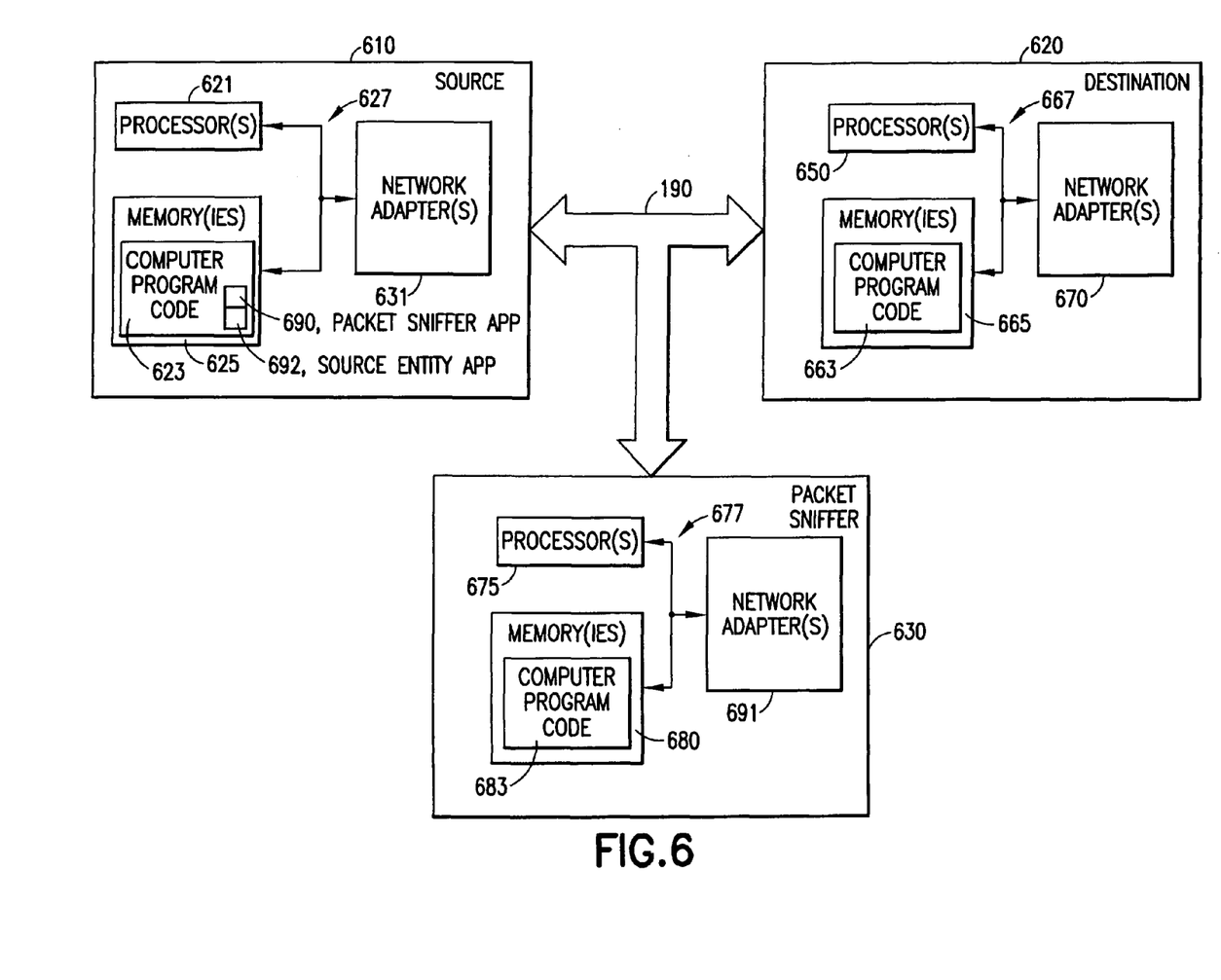
FIGS. 6 and 7 are block diagrams of exemplary systems into which the exemplary embodiments may be practiced.

Turning now to FIG. 6, a block diagram is shown of an exemplary system into which the exemplary embodiments may be practiced. In this example, the source 610, destination 620, and packet sniffer 630 are shown as individual network entities (e.g., nodes) and operate on the network 190. The source 610 includes one or more processors 621, one or more network adapters 631, and one or more memories 625, interconnected via one or more buses 627. The one or more memories 625 include computer program code 623. The one or more memories 625 and the computer program code 623 are configured, with the one or more processors 621, to cause the source 610 to perform one or more of the operations described herein. The computer program code 623 may be programmed to cause the source 610 to perform the operations of, e.g., the watermarking process 311 and FIGS. 3 and 4 described above. The network adapters 631 may be wired, wireless, or both.

The destination 620 includes one or more processors 650, one or more network adapters 670, and one or more memories 665, interconnected via one or more buses 667. The one or more memories 665 include computer program code 663. The one or more memories 665 and the computer program code 663 are configured, with the one or more processors 650, to cause the destination 620 to perform one or more of the operations described herein. The computer program code 663 may be programmed to cause the destination 620 to perform the operations described above. It is noted that if there are multiple network adapters 670, each network adapter 670 should have a unique MAC address 126. The network adapters 670 may be wired, wireless, or both.

In an exemplary embodiment where the packet sniffer is remote, the packet sniffer 630 includes one or more processors 675, one or more network adapters 690, and one or more memories 680, interconnected via one or more buses 677. The one or more memories 680 include computer program code 683. The one or more memories 680 and the computer program code 683 are configured, with the one or more processors 675, to cause the packet sniffer 630 to perform one or more of the operations described herein. That is, the computer program code 683 may be programmed to cause the packet sniffer 630 to perform the operations described above in relation to, e.g., FIGS. 3 and 5. The network adapters 691 may be wired, wireless, or both.

In an exemplary embodiment where the packet sniffer is local, the packet sniffer could be implemented as a packet sniffer application (app) 690 in computer program code 623 of the one or more memories 625. That is, the packet sniffer application 690 is implemented as part of the source (e.g., node) 610 and acts as the packet sniffer 330 described above. The source entity application 692 acts as the source entity 310 described above.

There are a number of reasons the packet sniffer application 690 (e.g., packet sniffer 330) might be implemented on the source 610. For instance, in most modern operating systems, in order to determine the MAC address of the destination, an application (such as source entity application 692) will need low-level access to privileged data structures like ARP (address resolution protocol) tables and kernel IP tables. Instead of using this low-level access, by just implementing the sniffer 690/330 at the source 310/610, the sniffer application 690 can listen to the packets transmitted by the source (e.g., application 692) and determine the destination MAC address from the signature encoded in the packets.

Illustratively, the packet sniffer (e.g., application 690) can send (e.g., to the application 692) the mapping of MAC addresses to different signatures (e.g., watermarks) (if any) that the packet sniffer observes on the medium. So the packet sniffer can send information like <MAC 1, Signature 1>, <MAC 2, Signature 2> and so on to the source, where the Signatures are indications of the modifications of the property (e.g., indications of the watermarks). The source, which is actually encoding these different signatures on a per destination basis, can now easily ascertain the mapping between a destination and its MAC address. For example, the source may be communicating with a destination that is trying to register with a name "Laptop-X". Hence, assume the source encodes packets to the destination with a signature XYZ. Now, the sniffer can determine that the signature XYZ actually corresponds to MAC address ABC, and the sniffer tells the source that signature XYZ corresponds to MAC address ABC. Using this information, the source can ascertain and store that the MAC address of Laptop-X is ABC. The source can then use this unique information for uniquely identifying this device for any future communication or identification. One specific use case for this scenario is that the source needs the MAC addresses of nearby devices to determine in which direction these devices are located with respect to the source and then establish communication channels with the sources.

In particular, the source uses this mechanism to determine the destination MAC address without requiring any low-level access to network tables of the operating system. Further, the source can use this destination MAC information to uniquely identify this destination in future communications, which can be helpful for destination-specific actions such as determining the direction of a destination with respect to source, storing per-destination authentication keys, or caching content on a per-destination basis that can allow seamless pausing and continuation of sessions even if the LP address and other high-level identification of the device is changing.

It is further noted that having the packet sniffer application 690 be separate from the source entity application(s) 692 has a benefit that multiple applications 692 may communicate with the packet sniffer application 690. However, the applications 690, 692 may also be combined into a single application.

Figure 7:
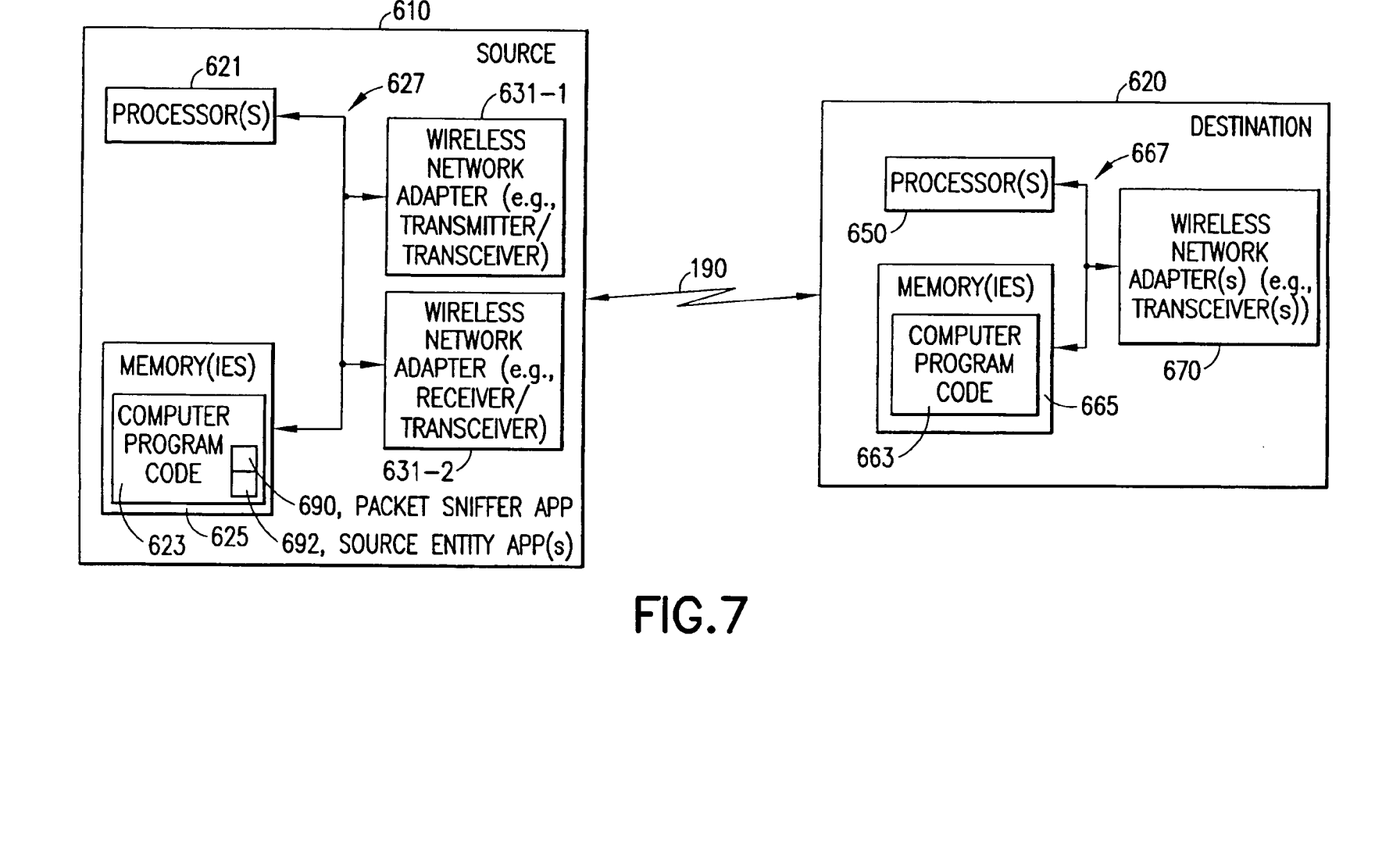

Turning now to FIG. 7, a block diagram is shown of an exemplary system into which the exemplary embodiments may be practiced. In this example, the source 610 is, e.g., a wireless device such as a user equipment, smart phone, computer, or the like. The network 190 is wireless, and the network adapters 670 in the destination 620 (e.g., a base station or another wireless device) are wireless and may include multiple transceivers. The wireless network 190 may be Bluetooth, WLAN (wireless local area network), cellular, or any other wireless network. There are two network adapters 631-1 and 631-2, each of which may include a transceiver. In an illustrative embodiment, the source entity application 692 transmits using wireless network adapter 631-1 while the packet sniffer application 690 receives using the wireless network adapter 631-2. It is also possible for a single wireless (or wired) network adapter to send and receive at the same time, but many adapters 631 can perform only one or the other at the same time (i.e., only send and not receive or only receive but not send).

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 6. A computer-readable medium may comprise a computer-readable storage medium (e.g., memory 625, 665 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising one or more processors and one or more memories including computer program code; the one or more memories and the computer program code being configured, with the one or more processors, to cause the apparatus to perform at least the following:

sending over the network from a source entity to a destination entity a sequence of a plurality of packets, each packet in the sequence comprising a same identifier corresponding to a network entity on the network, wherein sending comprises modifying a property of the sequence of packets to uniquely identify the sequence of packets; and receiving information indicating that the identifier corresponds to the modification of the property;

wherein modifying further comprises modifying data rates for packets in the sequence to uniquely identify the sequence of packets using variances in data rates.

2. The apparatus of claim 1, wherein the information indicating the identifier corresponds to the modification of the property is performed without any low-level access to network tables of the operating system.

3. The apparatus of claim 1, wherein modifying further comprises modifying sizes of packets in the sequence to uniquely identify the sequence of packets using variances in packet sizes.

4. The apparatus of claim 1, wherein modifying further comprises modifying inter-arrival times between packets in the sequence to uniquely identify the sequence of packets using variances in inter-arrival times.

5. The apparatus of claim 1, wherein the network entity is the destination entity.

6. The apparatus of claim 1, wherein the identifier is not encrypted in the packets, but all other portions of the packets are encrypted.

7. The apparatus of claim 1, wherein receiving further comprises receiving the identifier from a packet sniffer.

8. The apparatus of claim 1, further comprising associating the received information with a destination name corresponding to the destination entity.

9. The apparatus of claim 1, wherein sending is performed for a plurality of destination entities and modifying for each destination entity modifies a property of a corresponding sequence of packets for the destination entity so that the modification is unique to the corresponding sequence of packets, and wherein receiving information further comprises receiving information for each of the plurality of destination identities.

10. The apparatus of claim 9, wherein the received information comprises a signature for each of the plurality of destination entities, each signature indicating one of the modifications.

11. The apparatus of claim 1, further comprising at least one network adapter, and wherein the sending and receiving are performed using the at least one network adapter, and wherein the one or more memories and the computer program code configured to, with the one or more processors, cause the apparatus to perform at least the following:
   examining the sequence of packets sent using the at least one network adapter from the source entity to the destination entity;
   determining whether the property of the sequence of packets was modified when sent by the source entity to uniquely identify the sequence of packets; and
   responsive to a determination the property of the sequence of packets was modified when sent to uniquely identify the packets, associating the identifier with the network identity.

12. An apparatus comprising one or more processors and one or more memories including computer program code; the one or more memories and the computer program code being configured, with the one or more processors, to cause the apparatus to perform at least the following:
   examining a sequence of packets sent over a network from a source entity to a destination entity, each packet in the sequence comprising a same identifier corresponding to a network entity on the network;
   determining whether a property of the sequence of packets was modified when sent by the source entity to uniquely identify the sequence of packets; and
   responsive to a determination the property of the sequence of packets was modified when sent to uniquely identify the packets, associating the identifier with the network identity;
   wherein determining further comprises determining that the sequence of packets was modified by the source entity through modification of sizes of packets in the sequence to uniquely identify the sequence of packets using variances in packet sizes.

13. The apparatus of claim 12, wherein determining further comprises determining the sequence of packets was modified by the source entity through modification of inter-arrival time between each packet in the sequence to uniquely identify the sequence of packets using variances in inter-arrival time.

14. The apparatus of claim 12, wherein determining further comprises determining the sequence of packets was modified by the source entity through modification of data rate for each packet in the sequence to uniquely identify the sequence of packets using variances in data rate.

15. The apparatus of claim 12, further comprising sending the identifier to the source entity.

16. The apparatus of claim 12, wherein associating the identifier with the network entity further comprises associating a destination name with the identifier, and sending at least the destination name and the identifier to the source entity.

17. The apparatus of claim 12, wherein the identifier is not encrypted in the packets, but all other portions of the packets are encrypted.

18. The apparatus of claim 12, wherein examining, determining, and associating are performed for a plurality of destination entities having a property of a corresponding sequence of packets for each destination entity modified so that the modification is unique to the corresponding sequence of packets, and associating further comprises associating a corresponding one of the identifiers for each of the plurality of destination identities.

* * * * *